United States Patent

Poque et al.

[11] 4,284,117
[45] Aug. 18, 1981

[54] STEEL BELTED RADIAL PLY TIRES WITH CAP PLIES EMPLOYING SINGLE YARN REINFORCING ELEMENTS

[76] Inventors: Dionysius J. Poque, Meischenfeld 17, Aachen-Kornelimuenster; Horst Lorenz, Peitschenweg 29, 5190 Stolberg-Buesbach, both of Fed. Rep. of Germany

[21] Appl. No.: 99,398

[22] Filed: Dec. 3, 1979

[30] Foreign Application Priority Data

Dec. 7, 1978 [DE] Fed. Rep. of Germany ....... 2853006

[51] Int. Cl.³ ............................................. B60C 9/20
[52] U.S. Cl. ............................... 152/361 R; 152/359; 152/361 DM; 57/902
[58] Field of Search .......... 152/330 R, 356 R, 356 A, 152/359, 361 R, 361 FP, 361 DM; 57/902

[56] References Cited

U.S. PATENT DOCUMENTS

| | | | |
|---|---|---|---|
| 3,503,432 | 3/1970 | Maiocchi | 156/124 X |
| 3,786,851 | 1/1974 | Mirtain et al. | 152/361 DM |
| 3,850,219 | 11/1974 | Snyder | 152/361 DM |
| 3,945,421 | 3/1976 | Poque et al. | 152/361 FP |
| 4,120,339 | 10/1978 | Shichman | 152/354 RB |
| 4,146,415 | 3/1979 | Caretta et al. | 152/361 R X |
| 4,183,389 | 1/1980 | Grosch | 152/361 DM |

OTHER PUBLICATIONS

Kovac, F. J., *Tire Technology*, The Goodyear Tire and Rubber Company, Fourth Edition, 1973, p. 21.

*Primary Examiner*—John T. Goolkasian
*Assistant Examiner*—L. E. Boland
*Attorney, Agent, or Firm*—Charles A. Blank; Steven H. Bazerman

[57] ABSTRACT

A steel belted radial ply tire construction characterized by an improved cap ply is disclosed. In the finished tire, a cap ply is formed from at least one layer of rubberized yarns of synthetic filamentary textile material. The cap ply is disposed in direct surrounding relation to the radially outermost belt ply of the tire. Since the cap ply is formed from single yarns rather than cords, the cap ply is thinner than conventional cap plies, has superior flexibility and heat dissipation characteristics. This abstract is not to be taken either as a complete exposition or a limitation of the present invention, the full nature and extent of the invention being discernable only by reference to and from the entire disclosure.

11 Claims, 10 Drawing Figures

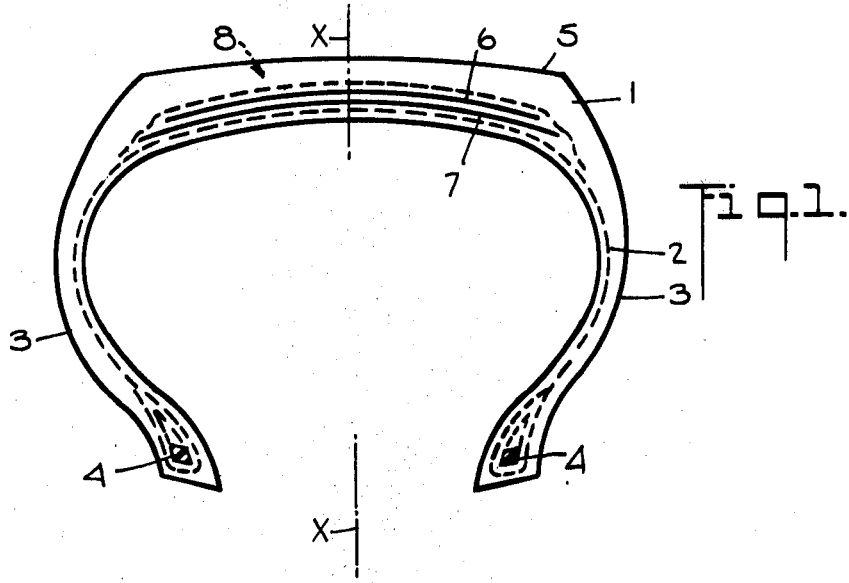
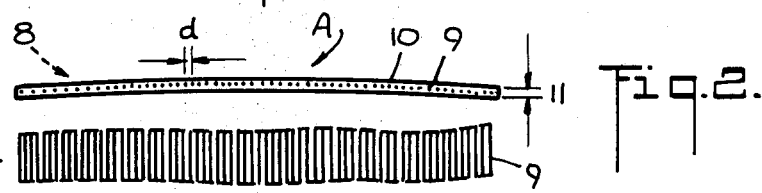
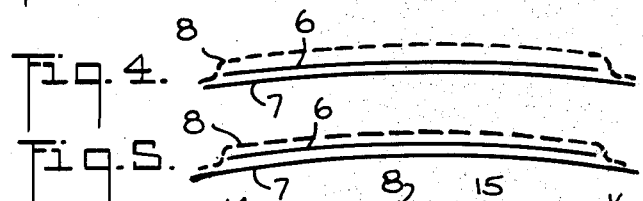
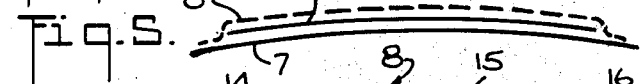
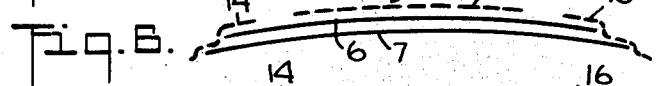
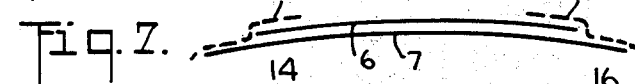
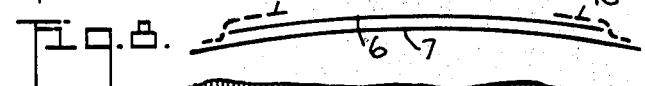
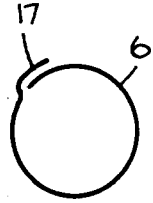
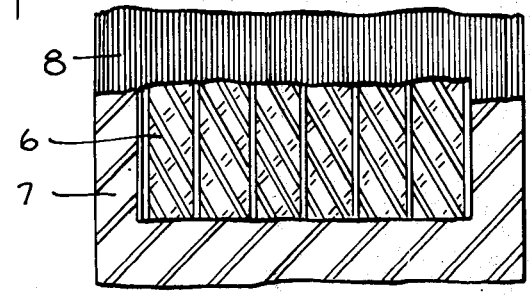

STEEL BELTED RADIAL PLY TIRES WITH CAP PLIES EMPLOYING SINGLE YARN REINFORCING ELEMENTS

BACKGROUND OF THE INVENTION

This invention relates to pneumatic tires for vehicles and more particularly to belted radial tires of the type having a cap ply overlaying the tire belt.

The expression "radial" when applied to tires means various tire constructions having a carcass with one or more reinforcement plies of tire cords extending from bead to bead in a substantially radial orientation i.e. the cords are oriented normal or substantially normal to the beads and to the crown centerline of the tire. In a mono-ply radial tire the carcass or body cords normally have a ninety degree bias angle, i.e., in the unshaped carcass they extend perpendicular to the planes of the beads. In a two-ply radial tire, the cords in each body ply are usually oriented at oppositely disposed small angles of up to 10° with respect to the perpendicular to the bead planes. In four ply or heavier radial ply tire constructions, similarly opposed orientation of the cords in successive body plies is usually employed. All of these carcass constructions are contemplated to be within the scope and meaning of the expression "radial" as used herein.

Radial tires are generally constructed with a breaker or belt interposed in the crown region of the carcass and the thread for reinforcing the latter, such belt being composed of one or more layers or plies of tire cords which are generally inextensible and are made from such material as metallic wires, glass fibers, rayon, etc. In a mono-ply belt, the cords have a low bias angle of approximately 0°, i.e., they are oriented substantially parallel to the planes of the beads and to the median equatorial plane or crown center line of the tire. If the belt is of a multi-ply construction, similar but opposed low bias orientations of the cords or cables generally at angles ranging up to approximately 30° with respect to the median equitorial planes of the tire are employed in successive plies.

It is known in the art to provide an additional cover or cap ply of textile cords overlying the belt. For example, in U.S. Pat. No. 3,503,432 issued on Mar. 31, 1970 to L. Maiocchi, a cap ply is disclosed which is made of a heat shrinkable nylon cords. The shrinkage stresses developed in such cords are utilized to apply compressive pressure to the underlying belt plies and to absorb some of the stress present in the tire during operation. Similarly U.S. Pat. No. 3,850,219, issued on Nov. 26, 1974 to R. H. Snyder and U.S. Pat. No. 3,786,851 issued on Jan. 23, 1974 to H. Mirtain each disclose the use of such a cap ply.

The use of a cap ply endows a tire with additional travel comfort and safety, superior rolling resistance and in general improves the high speed characteristics of tires. The cap ply protects the metallic cords of the belt against the effects of humidity and reduces ply separation in the belt edges at elevated speeds.

The prior art cap plies are formed from a sheet of rubber like material, having polyamide or polyester cords of double or triple filament yarn construction positioned therein. The properties of the cords determine the properties of their respective cap plies. The use of such cords in cap plies has been relatively successful because of the cords tear resistance, elongation and shrinkage properties. These cords also, however, determine the flexibility, heat dissipation characteristics, thickness and weight of the cap plies.

Certain problems arise with regard to the use of cap plies formed from such cords due to the resulting cap plies lack of flexibility, poor heat dissipation characteristics, bulk and heavy weight. The service life and operating characteristics of tires can be seriously effected by these factors.

SUMMARY OF THE INVENTION

It is an object of the present invention to improve the operating characteristics and service life of tires having cap plies through the use of more flexible, lighter and less bulky cap plies. Simultaneously, it is an object to make such cap plies cheaper to manufacture than tires having conventional cap plies. It is a further object of the present invention to produce a lighter, better balanced, more flexible tire having better heat dissipation from the high stress areas of the tire.

Generally speaking, the objects of the present invention are attained by the use in the cap plies formed from single yarns having between 100-400 turns per meter instead of cords formed from several of such yarns. As with the cord used in conventional cap plies, the single yarns may be of polyamide or polyester. However in certain instances, rayon or aromatic polyamides may be used. Suitable single yarns for use in cap plies are readily available and constitute the raw material for the manufacture of the textile cords which have been previously used in cap plies and for other cord plies.

Since the thickness of the cap ply is a function of a diameter of the yarns or cords forming it, the use of single yarns rather than cords substantially reduces the thickness of the cap ply in comparison with conventional cap plies formed from cords. This results in a reduction of the weight of the cap ply. Such reduction in the weight has a major effect on the life of the tire. The rolling resistance of the tire is improved by the thinner cap ply of the present invention. The accumulation of heat in the area of the cap ply is likewise substantially reduced. Such improved dissipation of heat has a favorable effect on the bonding of the edges of the plies forming the tire belt or breaker.

Equally, by the use of single yarns rather than cords, the cap ply has greater flexibility than has been hereto possible. With the use of such yarn, it is possible to have a higher packing density than is obtainable in conventional cap plies with an improvement in such characteristics as strength.

The novel cap ply construction of the present invention distinguishes over the prior art not only in different operating properties but by a substantial reduction in cost resulting not only from the saving in raw materials but from the elimination of operating cycles inherent in the assembling and twisting of yarns into cords.

BRIEF DESCRIPTION OF THE DRAWINGS

The foregoing and other objects of the features of the present invention will be more clearly understood from the following detailed description thereof, read in conjunction with the drawings in which:

FIG. 1 is a diagramatic transverse radial section of a tire in accordance with the present invention.

FIG. 2 is a diagramatic cross sectional view of the cap ply in accordance with the present invention.

FIG. 3 is a diagramatic top view of the cap ply of the present invention.

FIGS. 4-8 are diagramatic cross-sectional views of varying embodiments of the cap ply in combination with the tire belt in accordance with the present invention.

FIG. 9 is a diagramatic side view of the cap ply in accordance with the present invention; and FIG. 10 is a cut away partial top view of a tire showing the cap ply and belt plies with individual cords and yarns illustrated on an enlarged scale to make details more readily visible.

DETAILED DESCRIPTION OF THE EMBODIMENTS

Referring now to FIG. 1, a radial tire 1 according to the present invention is shown comprising a tire carcass 2 formed from one or more radial or substantially radially superimposed carcass plies, side walls 3 overlying the respective lateral regions of the carcass 2 and terminating at their radially inwardmost edges in a pair of beads 4, a tread 5 overlying the crown region of the carcass 2 and adjoining the side walls 3 at their radially outwardmost region, two belt plies 6 and 7 superposed one on the other, both interposed between the crown region of the carcass 2 and the tread 5 for reinforcing the latter, and a cap ply 8 interposed between radially outwardmost belt ply 6 and tread 5.

The plies forming the carcass 2 are made from layers of rubberized cords or cables of any suitable natural or synthetic fibers such as nylon, rayon, polyester, metal wire, glass fiber, etc.

The belt plies 6 and 7 are layers of rubberized, parallel, metallic reinforcing elements, preferably steel, which may be either lamelliform, i.e., in the form of flat strips or bands with rounded edges or filiform, i.e., in the forms of generally round wires or cables. As shown in FIG. 1, the two belt plies 6 and 7 are of different widths in the direction of the tire axis, with the widest ply 7 having a width corresponding to the width of the tread 5. Alternatively, these plies 6 and 7 may both be made of equal width. The cord elements forming each of the plies 6 and 7 are oriented parallel to one another. The plies 6 and 7 are generally symmetrically oriented at respective equal but opposite bias angles to the median equatorial plane X-X'.

The cap ply 8 is superimposed on the radially outwardmost belt ply 6 in direct contact with belt ply 6. The cap ply 8 is formed from a series of reinforcing elements 9 oriented parallel to each other in the circumferential direction of the tire i.e., have substantially 0 bias angle. The construction of the cap ply is most clearly seen in FIGS. 2 and 3. In accordance with the present invention, the reinforcing elements 9 of the cap ply 8 are formed from single yarns. Each of the yarns and the spacing between adjoining parallel single yarns 10 are covered or filled with a rubber material. The yarns are arranged to form an essentially flat plane.

The reinforcing elements 9 are formed of a heat shrinking material such as a polyamide of appropriate strength, elongation and shrinkage properties as more fully disclosed in U.S. Pat. Nos. 3,786,851 and 3,850,219. As discussed in said patents, since the cap ply 8 is formed from a heat shrinking material, it acts to apply compressive forces to the belt plies 6 and 7.

The single yarns of reinforcing elements 9 are formed from a plurality of elementary filaments having approximately 100-400 twists per meter and preferably having 200 twists per meter. Each of the single yarn reinforcing elements 9 can be manufactured by heat drawing and then dipping or dipping and then heat drawing. If the filaments are dipped before heat drawing, there is improved adhesion of the rubber to the yarn. The twists in the yarn can either be a Z or S direction. Suitable single yarns are readily available since they constitute the raw material for the manufacture of the cords normally used in tire construction.

The single yarns forming the reinforcing elements 9 are formed from a small group of elementary filaments. Thus the single yarns' diameters are relatively small in comparison to cord reinforcing elements used in prior art to form cap plies. Since the thickness of the cap ply 11 should be 20 to 100% greater than the diameter of the reinforcing elements 9 whether cords or single yarns, cap plies made in accordance with the present invention will be substantially thinner than that of the prior art.

Yarns made from standard polyamides in this manner vary in diameter from 0.3-0.45 mm. Single yarns made of Nylon 66 decitex 940/1 have a diameter of about 0.3 mm. For Nylon 66 decitex 1400/1 the diameter is 0.45 mm. For polyester yarns, decitex 1100/1, it is 0.38 mm and decitex 1400/1, it is approximately 0.4 mm. Thus, if the single yarns 9 have a diameter of 0.3 mm, the cap ply could have thickness of about 0.4 mm. Cap plies of the prior art normally have a thickness of approximately 0.7 mm. This represents a substantial reduction in the thickness of the cap ply. The reduced thickness endows the novel cap ply of the present invention with enhanced flexibility. The protective and compressive functions are, however, comparable to that of those in cap plies of the prior art made with cords due to the higher packing density possible in the cap ply 8 of the present invention.

In the present invention, the diameters of the single yarns not only define the thickness 11 of the cap ply 8, but control the maximum packing density, i.e., the number of yarns per decimeter of width. FIG. 3 is a diagrammatic top view of the yarns 9 forming cap ply 8, the vertical lines represent the single yarns in the ply. As previously indicated each of the yarns is oriented parallel to one another with 0° bias angle. Since the single yarns 9 forming the cap ply 8 of the present invention have a smaller diameter then the cord elements of the prior art, the packing density of the single yarns can be much greater than that of the prior art. Thus cap plies in accordance with the present invention can be successfully made having approximately 60-300 single yarns per decimeter. The preferred range of the packing density is between 100 and 150 single yarns per decimeter. This results in a high ratio of yarn 9 to other elements forming the cap ply 8 in the range of 30-90%. Such a high ratio cannot be achieved with standard textile cord elements.

The compressive effect of the cap ply 8 of the present invention and of the prior art cap plies is a function of the packing density. Since a greater range of packing density is possible in the cap ply 8 of the present invention, the compressive effect of the cap ply can be made less, identical or greater than that of the prior art cap plies formed from cords.

Since there is no necessity to form cords to make the cap ply 8 of the present invention, the associated steps of assembling and twisting the yarns to form the cord are eliminated with a substantial reduction in the cost of manufacturing of the cap plies.

The dimensions and arrangement of the cap plies formed from single yarn may be varied in many respects while keeping within the teachings of the present invention. Where the preferred embodiment in accordance with FIG. 1, the cap ply 8 extends beyond the marginal areas of the widest part of belt plies 6 and 7, this is not necessary to carry forward the invention. For example in the embodiment of FIG. 4, a cap ply is shown having the identical width as that of the widest belt ply 7. In FIG. 5 the cap ply is shown in which the width of the cap ply 8 lies between that of the two belt plies 6 and 7.

The width of the cap ply 8 can be up to 25% narrower than the widest belt ply so that the cap ply 8 need extend only over the central crown area on either side of the median equatorial plane. In FIG. 6 the cap ply 8 is formed in three strips 14, 15 and 16. The central strip 15 covers the central crown area while the two strips 14 and 16 cover the outer edge areas of the belt plies 6 and 7. Central strip 15 can be omitted as illustrated in the configurations shown in FIGS. 7 and 8.

FIG. 9 is a reduced scale diagrammatic side view of the cap ply showing the abutment of the two ends of the cap ply 8. As can be seen from the drawing, it is preferable that the cap ply 8 extend more than one complete turn of the circumference of the tire 1 so that the ends of the cap ply overlays at 17. The overlapping may extend up to one additional complete turn.

As noted previously, the single yarns 9 forming the cap ply 8 may be provided with either a Z or S twist. The direction of twist of a cap ply should be selected based on the direction of the twist and orientation of the cord elements forming belt plies 6 and 7. FIG. 10 is a diagrammatic top view showing the inter-relation between the cap ply 8 and the belt plies 6 and 7. As shown in FIG. 10, when the single yarns 9 forming cap ply 8 have a Z-twist, the bias angle in the cords forming belt ply 6 should be arranged as shown to develop a crossbracing between the cords of belt ply 6 and the single yarns 9 of the cap ply 8. Correspondingly belt ply 7 will be oriented as shown with an equal and opposite bias angle. The cords forming belt ply 6 may be provided with an S-twist to enhance the bracing effect. In such a case, the cord elements of the lower belt ply 7 should have a Z-twist. The diametrically opposite arrangement of bias angles and twists should be made if the single yarns 9 of the cap 8 have an S-twist. The single yarns 9 forming the cap ply 8 may be assembled with alternate S and Z-twisted yarns or in groups of alternate S and Z-twisted yarns. This can be done by means of a rolled calendar plant on which the cap ply 8 is preferably manufactured.

As a specific example, a cap ply 8 in accordance with the preferred embodiment can be manufactured using single yarns formed from a polyamide having 200 turns per meter within an admissible tolerance range of ±15%. In the hot-stretch treatment, the single yarns 9 should be subject to a molecule-oriented stretching of a few percent as a result of which the tensile strength and elongation would be adjusted to values for use in tire materials.

The shrinkage of the resulting single yarn 9 at elevated temperatures such as vulcanization temperatures, would be above 1.5 percent and may be as large as 4 percent. The modulus of elasticity of the polyamide yarn is in the range of 1,000 and 10,000 N/sq. mm. This corresponds substantially to a value of between 100–1000 cN/tex. The single yarns would then be fed to a roll calendar plant in a selected packing density and then rubberized. The resulting strip is wound onto a roll. Due to the calendaring and the forming of a roll, the strip of material becomes slightly tensioned. Further tension is applied upon the application of the strip during the building of the tire blank. As a result one obtains a precompression of the belt by the cap ply 8 prior to vulcanization. The radical expansion of the tire blank in the tire mold under the pressure of the curing bag is substantially greater with matched metal molds than segmented molds, but the use of either is contemplated in the present invention. During vulcanization, the single yarns of the cap ply 8 shrink by about 8% with respect to their initial state. As a result the cap ply 8 places a compressive biasing force on the belt plies 6 and 7 uniformly over their circumference.

The rubberized strip forming the cap ply can be applied onto the belt plies 6 and 7 without biasing. The molding and vulcanization is then performed in a vulcanization press without segmented components. Due to the inflation pressure of the curing bag, the molding results in extending the cover ply by about 1 to 5%. Following removal of the tire from the mold the tire is kept in a post-treatment station under sufficient air pressure until curing is complete. The cap ply thereby preserves its biasing.

Although the foregoing description has described belt plies 6 and 7 formed from metal cords such as steel, it will be understood that the principles of the present invention are applicable to belts having belt cords of other high modulus materials such as a rayon, glass fiber, and the like incorporated therein.

It will be understood that the foregoing description of the preferred embodiments of the present invention is for the purpose of illustration only and that the various structural and operational features as herein disclosed are susceptible to a number of modifications and changes none of which may entail any departure from the spirit or scope of the present invention as defined in the hereto appended claims.

Having thus described the invention, what is claimed and desired to be protected by letters patent is:

1. A pneumatic tire comprising a radial ply carcass, a tread overlaying the crown region of said carcass, a belt interposed between said tread and said crown region of said carcass in circumferential surrounding relation to the latter, said belt including at least two plies of belt cords of high modulus material, the belt cords in each ply extending parallel to one another and being in crossing relation with respect to the cord of the next adjacent belt ply, a cap ply interposed between the radially outwardmost one of said belt plies and said tread, said cap ply consisting of a strip of material having non-metallic reinforcing elements parallel to one another and to the median plane of the tire, said reinforcing elements consisting of a series of single yarns only, having a twist of approximately 100 to 400 turns per meter and having a packing density of said single yarns in said cap ply between 60 to 300 yarns per decimeter and being longitudinally prestressed for exerting compressive stress on said belt plies.

2. A pneumatic tire according to claim 1 where the single yarns forming the cap ply reinforcing elements have a twist of approximately 200 turns per meter.

3. A pneumatic tire according to claim 1 wherein the thickness of the cap ply is approximately 20 to 100% greater than the diameter of said single yarns.

4. A pneumatic tire in accordance with claim 1, wherein the packing density of said single yarns in said cap ply is between 100–150 yarns per decimeter.

5. A pneumatic tire in accordance with claim 1 wherein the yarn is selected from the group consisting of polyamide, polyester, rayon and aromatic polyamide.

6. A pneumatic tire in accordance with claim 1 wherein said cap ply width is equal to or greater than that of the widest belt ply.

7. A pneumatic tire according to claim 1 wherein the cap ply is up to twenty-five percent narrower than the widest belt ply.

8. A pneumatic tire according to claim 1 wherein the cap ply consists of two or more strips of material.

9. A pneumatic tire in accordance with claim 8 where said strips of material are arranged to cover the edges of at least one of the belt plies.

10. A pneumatic tire according to claim 1 wherein said single yarns have a Z-twist in the cap ply and the next radially inward belt ply is formed from parallel reinforcing elements oriented to incline to the left.

11. A pneumatic tire according to claim 1 wherein said single yarns have an S-twist in the cap ply and the next radially inward belt ply is formed from parallel reinforcing elements oriented to incline to the right.

* * * * *